United States Patent [19]

Kramer

[11] Patent Number: 4,596,734
[45] Date of Patent: Jun. 24, 1986

[54] WEAR RESISTANT COMPOSITES

[75] Inventor: James H. Kramer, Akron, Ohio

[73] Assignee: The B. F. Goodrich Company, Akron, Ohio

[21] Appl. No.: 564,615

[22] Filed: Dec. 22, 1983

Related U.S. Application Data

[63] Continuation-in-part of Ser. No. 246,567, Mar. 23, 1981, which is a continuation-in-part of Ser. No. 126,760, Mar. 3, 1980, abandoned.

[51] Int. Cl.$^4$ ............................................. B32B 7/02
[52] U.S. Cl. ..................................... 428/213; 428/99; 428/492; 428/450; 428/462; 428/516; 428/519; 264/126
[58] Field of Search .............. 264/126; 428/450, 462, 428/463, 465, 99, 213, 492, 516, 519

[56] References Cited

U.S. PATENT DOCUMENTS

| | | | |
|---|---|---|---|
| 3,690,925 | 9/1972 | Morris | 428/516 |
| 3,979,549 | 9/1976 | Wilkinson | 428/450 |
| 4,007,298 | 2/1977 | Feehan | 427/195 |
| 4,307,133 | 12/1981 | Haselier | 427/195 |

Primary Examiner—Edith Buffalow
Attorney, Agent, or Firm—Joseph Januszkiewicz

[57] ABSTRACT

A composite (10) which presents a layer (20) of ultra-high molecular weight polyethylene as the wear resistant surface. The polyethylene layer (20) is secured to a metallic backing plate (12) by virtue of an elastomeric layer (13) that is interposed between the metallic backing plate (12) and the polyethylene layer (20) and is bonded to each without the polyethylene and the metallic backing plate being otherwise bonded to each other. This configuration provides a means by which to mount a wear resistant polyethylene layer from a metallic backing plate and at the same time accommodate the difference between the disparate coefficients of expansion of polyethylene and metal. The composite (10) can be readily formed by placing a layer of uncured elastomer (13) on the prepared surface (11) of a metallic backing plate (12), spreading an ultra-high molecular weight polyethylene powder (15) over the uncured elastomer and heating the thus assembled components, preferably under pressure, to cure the elastomer and melt the polyethylene powder. When cooled, and the melted powder (15) coalesces into polyethylene layer (20), the resulting wear resistant composite can be formed by conventional cold working processes into desired configurations.

7 Claims, 7 Drawing Figures

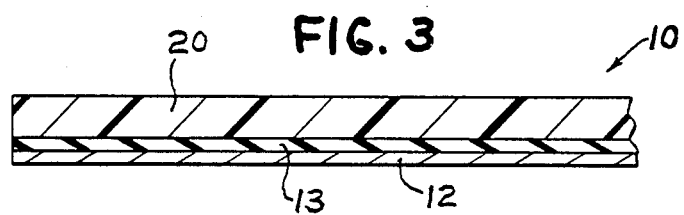
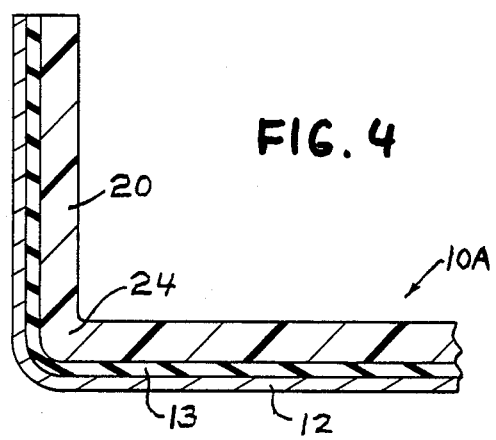
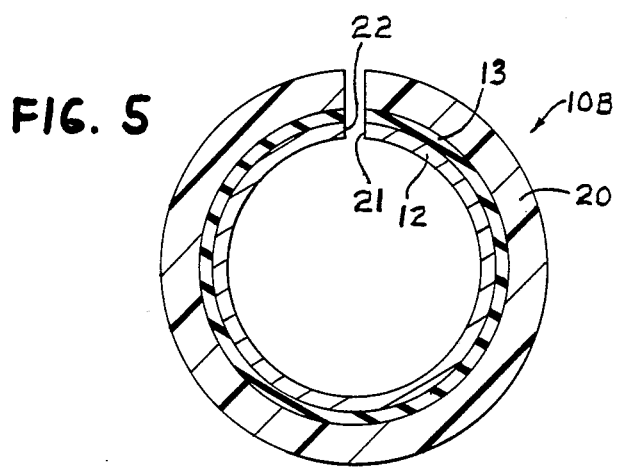

WEAR RESISTANT COMPOSITES

CROSS REFERENCE TO RELATED APPLICATION

This application is a continuation-in-part of co-pending application Ser. No. 246,567 filed Mar. 23, 1981 which was a continuation-in-part of patent application Ser. No. 126,760 filed Mar. 3, 1980 now abandoned.

BACKGROUND OF THE INVENTION

This invention relates generally to the use of ultra-high molecular weight polyethylene for a wear resistant surface and more particularly to the means by which such ultra-high molecular weight polyethylene can be effectively bonded to metallic backing plates.

Ultra-high molecular weight polyethylene can be produced with molecular weights from 500,000 to approximately six million, and as a result the material has excellent wear properties, including high impact strength, breaking strength, bending strength and abrasion resistance. Moveover, ultra-high molecular weight polyethylene possesses excellent anti-friction properties. In fact, when dry sliding against such metals as steel, brass or copper ultra-high molecular weight polyethylene exhibits apparent self-lubricating characteristics.

Ultra-high molecular weight polyethylene is water repellant and does not absorb water to any extent sufficient to induce swelling or other dimensional change. Thus, the exceptional qualities of ultra-high molecular weight polyethylene are maintained independently of the environmental moisture or humidity where the ultra-high molecular weight polyethylene is used.

All considered, ultra-high molecular weight polyethylene is promoted for uses where a surface is subjected to various types of abrasion, such as sliding abrasion, light impact abrasion or heavy impact abrasion.

For such uses, however, ultra-high molecular weight polyethylene has heretofore been supplied in sheet form, though of various thicknesses, with extensive instructions as to how the material might best be secured to a substrate. The mounting instructions suggest using various bolts, screws, rivets or power actuated fasteners. Such instructions generally warn that the fasteners must be relatively closely spaced in an attempt to minimize warping and shrinking inherent to the thermoplastic nature of ultra-high molecular weight polyethylene. Such mounting requirements mitigate against effective usage of such sheets on cured or intricate surfaces.

Thus, installation costs have been necessarily compounded, and attempts to bond the ultra-high molecular weight polyethylene directly to a metallic substrate, or backing plate, have been unsuccessful. First, no feasible means have heretofore been known to effect a successful bond between ultra-high molecular weight polyethylene and metal, and second, even if those two materials could be directly bonded, the co-efficients of expansion for ultra-high molecular weight polyethylene and metal are so disparate that the resultant internal stresses imposed on the polyethylene could destroy either the bond or the polyethylene sheet itself.

SUMMARY OF THE INVENTION

It is, therefore, a primary object of the present invention to provide an improved means by which to secure ultra-high molecular weight polyethylene to a metallic backing plate for forming a wear resistant composite.

It is another object of the present invention to provide a method for producing a wear resistant composite, as above.

These and other objects, together with the advantages thereof over existing and prior art forms which will become apparent from the following specification, are accomplished by means hereinafter described and claimed.

In general, a composite wear plate embodying the concepts of the present invention overcomes the difficulties attendant upon prior art attempts to secure ultra-high molecular weight polyethylene to a metallic backing plate by interposing an elastomeric layer between the polyethylene and the metallic backing plate and bonding one surface of the elastomer to the metallic backing plate and bonding the opposite surface of the elastomer to the polyethylene, both by acceptable techniques. The thickness of the elastomeric layer is such as to provide a resiliency to the composite to absorb stresses without incident.

Specifically, a wear resistant composite embodying the concept of the present invention may be effectively produced by preparing the surface of the metallic backing plate for bonding to an elastomer. The prepared surface may be coated with a cementitious compound to enhance the bond between the elastomer and the metallic backing plate, and a layer of uncured elastomer is deposited thereon. A measured amount of ultra-high molecular weight polyethylene powder is, in turn, spread over the uncured layer of elastomeric materials, and the thus assembled components are closed in a pressure mold and heat is applied not only to cure the elastomer but also to melt the polyethylene powder so that it will coalesce to form a layer of ultra-high molecular weight polyethylene that is bonded to the elastomer in a one shot operation. The thickness of the layer of rubber is between 15 to 40% of the total thickness of the wear resistant composite, with the preferred range being 20% to 30%. As an example of a specific thickness, it was found to provide excellent results where the layer of metal was one fourth of an inch (0.635 centimeters), the layer of rubber being one eighth of an inch (0.3175 centimeters) and the layer of ultra-high molecular weight polyethylene was one fourth of an inch (0.635 centimeters). In this example, the thickness of the elastomeric layer was 20% of the total thickness.

Six embodiments of a wear resistant composite according to the present invention, together with a method by which such composites may be made, are shown by way of example in the accompanying drawings and described in detail without attempting to show all of the various forms and modifications in which the invention might be embodied; the invention being measured by the appended claims and not by the details of the specification.

BRIEF DESCRIPTION OF THE DRAWINGS

FIG. 3 is a cross-sectional view through a typical wear resistant composite in sheet form and embodying the concept of the present invention;

FIG. 4 is a cross-sectional view of a wear resistant composite, as depicted in FIG. 3, formed as an angular structure;

FIG. 5 is a cross-sectional view of a wear resistant composite, as depicted in FIG. 3, formed as a discontinuous annulus;

A PREFERRED METHOD FOR CARRYING OUT THE INVENTION AND SEVERAL VARIATIONS OF FINISHED ARTICLES INCORPORATING THE INVENTION

Figure 1:
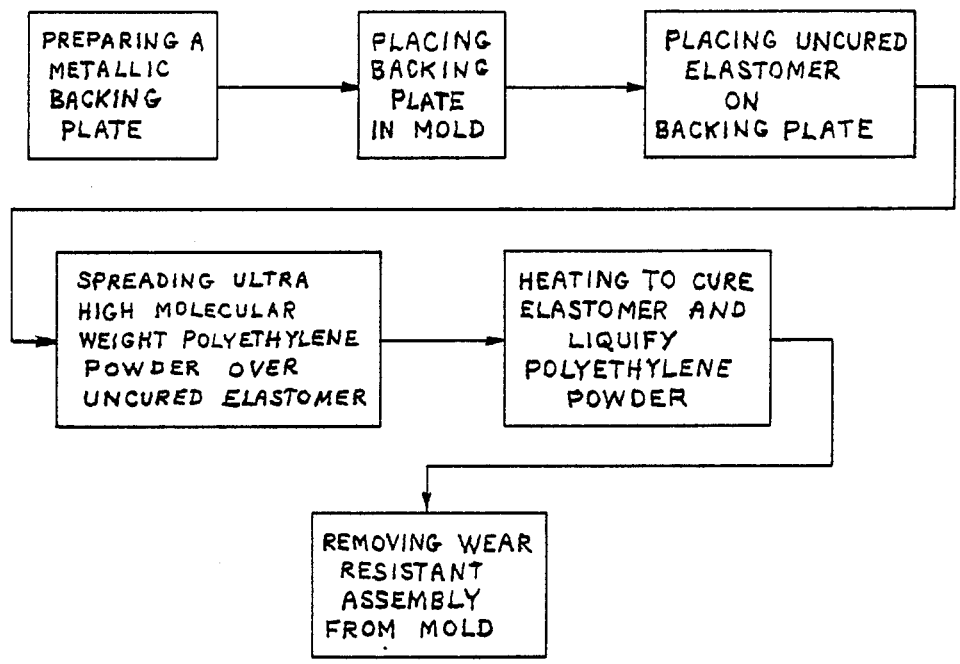
FIG. 1 is a diagrammatic representation of a method for making a wear resistant composite pursuant to the concept of the present invention.

With reference to the drawings, FIG. 1 constitutes a diagrammatic representation of process for manufacturing a wear resistant composite embodying the concept of the present invention, said composite and the representative variations thereof hereinafter described, being individually and collectively designated by the numeral 10 (FIG. 3).

The first step in the method of making a wear resistant composite 10 is to thoroughly and completely cleanse the surface of the metallic backing plate to which an elastomeric layer is to be adhered. The primary objective is to remove any dirt, grease or oxidation. The secondary objective is to present a surface to which some mechanical bonding can be achieved. In this latter regard the surface may be lightly abraded or even etched with an acid.

To enhance the adhesion between the metal and the elastomer a coating, or film, of cement may be applied to the prepared surface of the metallic backing plate.

The prepared metal backing plate may then be placed in a mold, after which a layer of uncured elastomeric material is placed upon the prepared surface of the metallic backing plate. After the elastomer is in position, a layer of ultra-high molecular weight polyethylene powder is spread over the layer of elastomeric material. With the polyethylene layer in place the thus assembled components are compacted and heated to cure the elastomer and melt the polyethylene powder which, as it cools, coalesces into a layer of polyethylene. The finished wear resistant composite 10 is then removed from the mold. As an example of a completed composite wear plate made by this process as illustrated, the ultra-high molecular weight polyethylene layer is one fourth of an inch (0.635 centimeters), the layer of the cured elastomer is one eighth of an inch (0.3175 centimeters) and the metal backing plate is one fourth of an inch (0.635 centimeters). In this instance, the elastomeric layer's thickness is twenty percent (20%) of the total composite's thickness. The range of the elastomer's thickness to the composite's total thickness is in the range of 15% to 40% with the preferred range being 20% to 30%.

An elastomer is defined as a substance that can be stretched at room temperature to at least twice its original length and, after having been stretched and the stress removed, returns with force to approximately its original length in a short time. (See Glossary of Terms as prepared by ASTM Committee D-11 on Rubber and Rubber-like Materials. Published by the American Society for Testing Materials).

The elastomeric or rubber material that can be used in constructing the composite wear plates of metal-elastomer-ultra-high molecular weight polyethylene can be any of well known elastomers including for example, natural rubber, copolymers of butadiene and acrylonitrile, copolymers of butadiene and styrene, copolymers of butadiene and alkyl acrylates, butyl rubber, olefin rubbers such as ethylene-propylene and EPDM rubber, flurocarbon rubbers, flurosilicone rubbers, silicone rubber, chlorosulfonated polyethylene, polyacrylates, polybutadiene, polychloroprene and the like.

Preferred elastomeric materials include natural rubber, copolymers of butadiene/acrylonitrile and copolymers of butadiene and styrene which is often referred to as SBR. 15% to 40% of the SBR may be styrene with the remainder being butadiene. 15% to 40% of the butadiene/acrylonitrile copolymers may be acrylonitrile with the remainder being butadiene. For good low temperature properties up to about twenty-five percent (25%) styrene or acrylonitrile may be used. The acrylonitrile content may vary from 18% to 30%. As the acrylonitrile content increases, the resistance to oil and fuel improves while the low temperature flexibility worsens.

Figure 2:
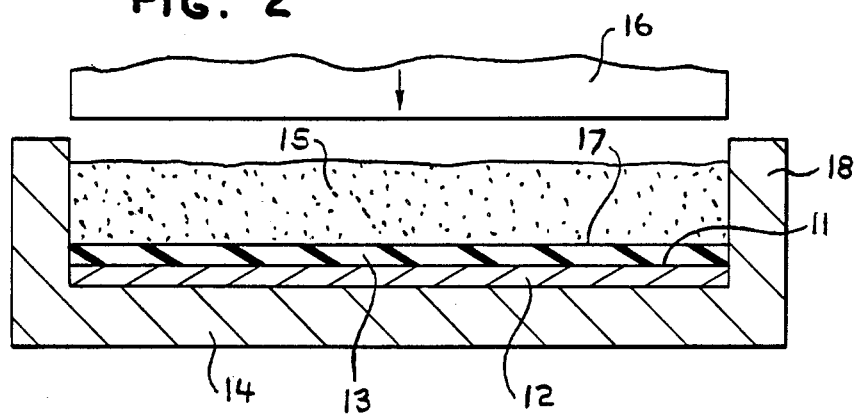
FIG. 2 is a schematic cross-section taken through a mold in which the components of a wear resistant composite embodying the concept of the present invention have been assembled prior to final processing.

With reference to FIG. 2, one surface 11 of a metallic backing plate 12 is cleaned and prepared so that a layer of elastomer 13 may be bonded thereto. The metallic backing plate 12 is then placed in a mold 14 with the prepared surface 11 facing outwardly of the mold 14. A layer of uncured elastomer 13 is then deposited on the surface 11. Optionally, it may be deemed desirable to apply a film of cement between the uncured elastomer 13 and the prepared surface 11 of the metallic backing plate 12.

The surface 17 of elastomer 13 facing away from plate 12 is covered with a layer of ultra-high molecular weight polyethylene powder 15. With the components in a position, the mold cover 16 is secured into the mold body 18 and sufficient pressure and heat are applied thereto to cure the elastomer 13 and melt the polyethylene powder 15. After the melted polyethylene powder has coalesced to form the polyethylene layer 20 the mold 14 is opened, the finished wear resistant composite 10 is removed. A composite 10 typifying that made in mold 14 is represented in FIG. 3. The metal backing plate 12 is bonded to the elastomeric layer 13 which is in turn bonded to an ultra-high molecular weight polyethylene layer 20. The resulting wear resistant composite 10 can be utilized to provide a wear surface in many desired locations where a planar surface is useful, such as a sand bin, a coal bin or any number of other places in which one would store abrasive materials.

The composite sheet can also be cold worked, or cold formed, by conventional methods such as through the use of a breakpress, roll or hand forming in order to provide shapes such as those shown in FIG. 4 wherein the polyethylene layer 20 is on the interior corner of an angular configured composite 10A. This type of a structure can be completed into a U-shaped channel, if desired, and used for a trough or chute. The high stress which will occur between the metal and polyethylene at bend 24 is accommodated by the medial elastomeric layer 13. The elastomeric layer 13 accommodates any differential stresses between the backing plate 12 and the polyethylene layer 20 resulting from the cold forming process as well as any differential stresses resulting from the disparate co-efficients of expansion of the packing pllate 12 vis-a-vis the polyethylene layer 20.

Figure 6:
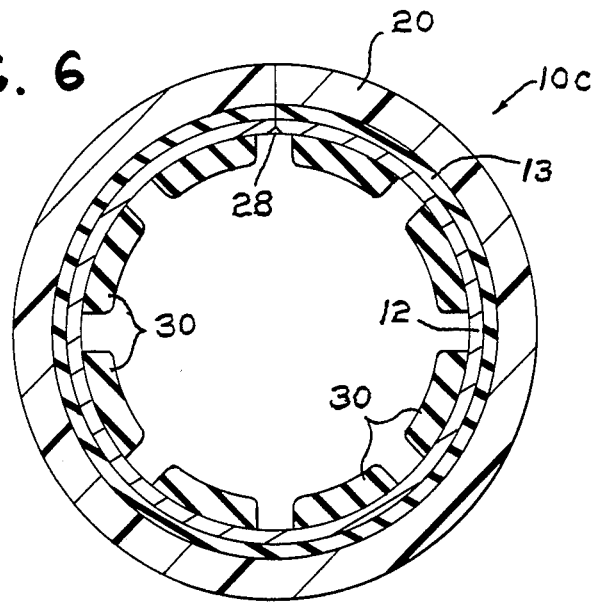
FIG. 6 is a cross-sectional view of a wear resistant member formed as a closed cylindrical annulus and embodying the concept of the present invention; and, FIG. 7 is a cross-sectional view of a wear resistant sheet, as depicted in FIG. 3, that has been, in turn, secured to a structural member.

As seen in FIGS. 5 and 6 a wear resistant composite 10B and 10C has been formed in an annular cross-section, such as might be desired for conveyor support rolls, or the like. Again, the medial elastomeric layer 13 between the metal and polyethylene layers 12 and 20, respectively, permits the required relative displacement of their surfaces during the forming operation and later under the influence of temperature variations. As seen in FIG. 5 there is a split between the opposed edges 21 and 22 of the annular backing plate in the composite 10B. In FIG. 6 the split has been closed, as by welding the opposed edges together, at 28, and by fusing the elastomer and polyethylene together to complete the cylindrical composite 10C. During the fusing operation, a plurality of rubber cushions 30 may be secured to the radially inner surface 31 of the backing plate 12. The cylindrical continuity of the backing plate 12 in composite 10C imparts structural integrity thereto. In addition, the cushions 30 afford a resilient means for absorbing shock loading or accommodating to modest misalignment of the shaft on which it is to be mounted.

Figure 7:
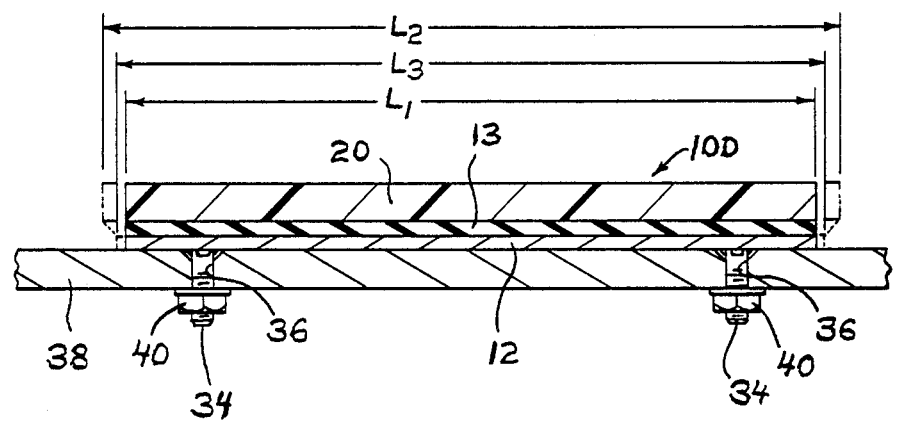

The composite 10D shown in FIG. 7 comprises a metal backing plate 12, an elastomeric layer 13 and an ultra-high mmolecular weight polyethylene layer 20. A plurality of threaded members 34 are secured to the backing plate 12 and extend perpendicularly outwardly therefrom in a direction opposite the elastomer and polyethylene layers 13 and 20. These threaded members 34 may extend through openings 36 in a structural support member 38. Each of the threaded members 34 is then engaged by a fastening means, such as nut 40, which secures the composite 10D to the structural support plate 38. The dimension, at assembly, is shown at $L_1$. Should the assembly operate in a high temperature environment, or in a variable temperature environment, the linear dimenions of the polyethylene layer 20 will, at high temperatures, expand to $L_2$ while the metallic backing pllate 12 will expand only to the linear dimension $L_3$. This differential in linear dimensions between the backing plate 12 and the polyethylene layer 20 is accommodated by the elastomeric layer 13.

From the foregoing it should be obvious that a very useful wear plate assembly can be provided with a metal base and an ultra-high molecular weight polyethylene wear surface. The difference in the coefficients of thermal expansion between these components, which in the past has prevented such assemblies, is accommodated by a layer of elastomer which is bonded between the metal and the polyethylene. The entire composite can be easily molded using a relatively uncomplicated molding process, and the finished composite can be then cold formed to a plurality of useful shapes. The percentage of thickness of the elastomeric layers for the various modifications is in the ranges as discussed in the first embodiment. It should thus be apparent that a wear resistant composite 10 embodying the concept of the present invention, and made pursuant to the method thereof, is fully capable of exploitation in industry and that the objects of the invention are otherwise accomplished.

I claim:

1. A wear resistant composite comprising a metallic backing plate; an intermediate elastomeric thick layer having a pair of spaced surfaces; one of said surfaces bonded to said metallic backing plate; and an ultra-high molecular weight polyethylene layer wherein said intermediate layer has sufficient thickness to provide a yieldable layer to accommodate any differential stresses between said backing plate and said polyethylene layer bonded to the other one of said surfaces of said intermediate elastomeric layer.

2. A wear resistant composite as set forth in claim 1 wherein said intermediate layer is thicker than said metallic plate.

3. A wear resistant composite as set forth in claim 1 wherein said composite is qreater than 1.27 centimeters in thickness.

4. A wear resistant composite as set forth in claim 1 wherein said elastomeric layer is in the range of thickness to the thickness of said composite between 15% to 40%.

5. A wear resistant composite as set forth in claim 4 wherein said composite is greater than 1.27 centimeters in thickness.

6. A wear resistant composite as set forth in claim 1 wherein the range of the elastomer's thickness to said composite's thickness is in the range of 20% to 30%.

7. A wear resistant composite as set forth in claim 6 wherein said composite is greater than 1.27 centimeters in thickness.

* * * * *

UNITED STATES PATENT AND TRADEMARK OFFICE
CERTIFICATE OF CORRECTION

PATENT NO. : 4,596,734
DATED : June 24, 1986
INVENTOR(S) : JAMES HARMON KRAMER

It is certified that error appears in the above-identified patent and that said Letters Patent is hereby corrected as shown below:

In claim 1, line 5, after the word "layer" insert --bonded to the other one of said surfaces of said intermediate elastomeric layer--;

In claim 1, lines 9 and 10, delete "bonded to the other one of said surfaces of said intermediate elastomeric layer".

Signed and Sealed this

Sixteenth Day of January, 1990

Attest:

JEFFREY M. SAMUELS

*Attesting Officer*     *Acting Commissioner of Patents and Trademarks*